Sept. 23, 1941.   J. O. ALMEN   2,256,699
V BELT PULLEY
Filed Nov. 13, 1939
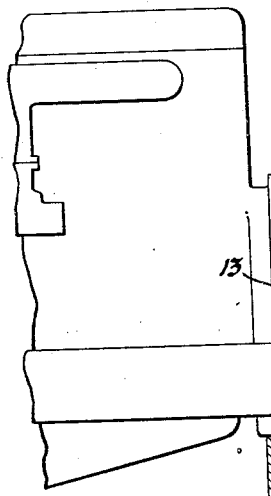
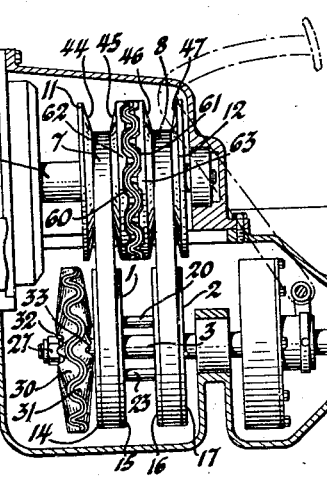
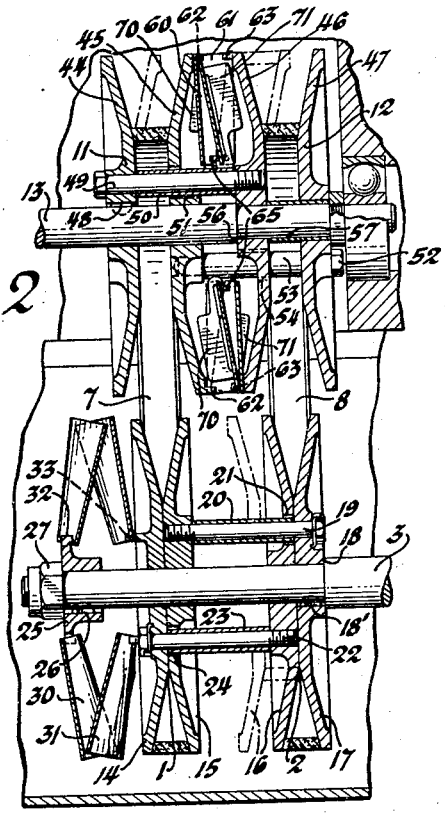
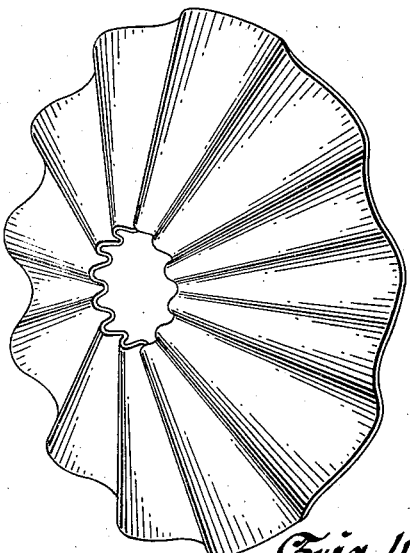
Fig. 1
Fig. 2
Fig. 3
Fig. 4
Inventor
John O. Almen
By Blackmore, Spencer & Flint
Attorneys Patented Sept. 23, 1941

2,256,699

UNITED STATES PATENT OFFICE 2,256,699

V BELT PULLEY

John O. Almen, Royal Oak, Mich., assignor to General Motors Corporation, Detroit, Mich., a corporation of Delaware Application November 13, 1939, Serial No. 303,990

8 Claims. (Cl. 74—230.17)

The invention relates to expanding and contracting V belt pulleys of variable effective diameter, such as are used where speed ratio variation is required between a driving shaft and a shaft driven by belt therefrom.

It relates especially to such V belt pulleys having one coned side movable relatively to another coaxially of the shaft on which they are mounted, to vary the effective diameter of the pulley for a V belt between said pulley sides, with spring means resiliently urging said sides towards each other to increase the effective diameter of the pulley. As usually constructed, one of the sides of the pulley is fixed to the shaft, and the other side slides on the guides or keyways on the shaft through which it drives or is driven, and when torque is being transmitted through the pulley and its shaft there is considerable friction between the pulley and the guides or keyways, which interferes with axial movement of the pulley sides relatively to each other.

The object of the invention is a V belt pulley in which guides or keyways between the pulley and the shaft are eliminated.

Another object of the invention is a V belt pulley in which the spring means itself serves as the driving connection between the adjustable parts of the pulley and the shaft.

Another object of the invention is a V belt pulley, in which the spring means is a disc spring provided with weights having a centrifugal force component tending to deflect the spring means, to vary the effective diameter of the pulley in accordance with the speed at which it is driven.

Another object of the invention is a V belt pulley in which all sliding bearings for the adjustable half of the pulley are eliminated.

A still further object of the invention is a variable ratio V belt pulley drive between two shafts in which the forces required to change the effective diameters of the pulleys are very small.

The above and other objects of the invention will be apparent as the description proceeds.

According to the invention, radially corrugated disc springs at one and the same time serve as spring means and as the driving connection between the adjustable half of the pulley and the shaft on which it is mounted. The radially corrugated disc springs may also serve as the sole means of supporting the adjustable half of the pulley on the shaft in a manner eliminating all sliding bearings. In those cases where automatic adjustment in accordance with the speed is required, centrifugal weights are suitably disposed on the radially corrugated disc spring means in a position in which they will tend to deflect the spring means, and hence control the movement of the adjustable half of the pulley in accordance with the speed at which it is driven.

The drawing shows various constructions of expanding and contracting V belt pulleys according to the invention.

In the drawing:

Fig. 1 shows a double V belt variable speed drive with automatic speed ratio variation, embodying V belt pulleys according to the invention.

Fig. 2 is an enlarged sectional view of part of Fig. 1.

Fig. 3 is a view of a V belt pulley in which the radially corrugated disc spring means serves also as the driving connection and the sole means of supporting the adjustable half of the pulley on its shaft.

Fig. 4 is an enlarged perspective view of one of the radially corrugated disc springs.

The V belt pulleys 1 and 2 of Figs. 1 and 2 are mounted on a shaft 3, which for purposes of illustration is shown provided with a clutch connection to the transmission of a motor vehicle, in Fig. 1. The shaft 3 is driven by a pair of V belts 7 and 8, from the V belt pulleys 11 and 12 on the driving shaft 13.

Each of the pulleys 1 and 2, has two coned sides 14, 15, and 16, 17, respectively. The side 17 of the pulley 2 is secured to the shaft 3 against a shoulder 18 thereon by a key 18', and the side 15 of the pulley 1 is secured to the side 17 of the pulley 2 by a number of bolts such as 19, which pass through tubular spacers such as 20, extending through clearance holes 21 in the side 16 of the pulley 2.

The sides 14 and 16 of the pulleys 1 and 2 constitute the axially adjustable halves of the pulleys and are loose on the shaft 3. They are connected together by bolts such as 22 which pass through tubular spacers such as 23, extending through clearance holes 24 in the side 15 of the pulley 1.

In compression between the side 14 of the pulley 1 and a flanged hub 25 secured to the end of the shaft 3 by a key 26 and a nut 27 on the shaft 3, are a pair of radially corrugated disc springs 30 and 31, of the conical or dished form shown most clearly in Fig. 4. They are arranged with their bases together and their apices spaced apart, the outer edges of the springs 30 and 31 being interlocked by their corrugations as shown. The inner edges of the springs 30 and 31 engage lugs or teeth such as 32 and 33 arranged circumferentially on the hub 25 and on the side 14 of the pulley 1, respectively. These lugs such as 32 and 33 are shaped to fit in the radially corrugated grooves on the outside surfaces of the springs 30 and 31 towards their apices. It will be appreciated that since the corrugations in the springs 30 and 31 are radial and divergent from the center outwards, both springs are automatically centered with the shaft 3 upon assembly, because the lugs such as 32 and 33 will only fit the corrugations in the springs at a fixed radial distance from the center thereof. It will also be seen that the spring means 30, 31 yieldingly urges the sides 14 and 16 of the pulleys 1 and 2 towards the sides 15 and 17 thereof, (i. e. towards a condition in which the pulleys have their maximum effective diameter) and at the same time is the sole means of connecting the axially adjustable pulley sides 14 and 16 to the shaft 3, for rotation therewith.

The V belt pulleys 11 and 12 on the shaft 13, each have two coned sides 44, 45, and 46, 47, respectively. The side 44 of the pulley 11 is secured to the shaft 13 by a key 48, and the side 46 of the pulley 12 is secured to the side 44 of the pulley 11 by a number of bolts such as 49, which pass through tubular spacers such as 50, extending through clearance holes 51 in the side 45 of the pulley 11. The side 46 of the pulley 12 is itself held fixed axially of the shaft 13 between a shoulder 56 thereon and a bushing 57. The sides 45 and 47 of the pulleys 11 and 12 constitute the axially adjustable halves of the pulleys, and are loose on the shaft 13. They are connected together by bolts such as 52, which pass through tubular spacers such as 53, extending through clearance holes 54 in the side 46 of the pulley 12.

In compression between the fast side 46 of the pulley 12 and the loose side 45 of the pulley 11, are a pair of radially corrugated disc springs 60 and 61, of the conical or dished form shown in Fig. 4. Unlike the disc springs 30 and 31 however, they are arranged with their apices towards each other and with their bases spaced apart, although, in the position illustrated, in which the pulleys 11 and 12 have their maximum effective diameter, the outer edges of the springs are compressed together.

The outer edges of the springs 60 and 61, engage lugs or teeth such as 62 and 63, arranged circumferentially on the side 45 of the pulley 11 and the side 46 of the pulley 12 respectively. These lugs such as 62 and 63 are shaped to fit in the radially corrugated grooves on the outside surfaces of the springs 60 and 61 towards their outer peripheries. The inner edges of the springs 60 and 61 at their apices, are keyed together in slightly spaced relationship by a floating ring 65. The sides of the ring 65 are shaped to fit in the radially corrugated grooves facing each other in the springs 60 and 61 and the ring is automatically centered relatively to the two springs because it will only fit the radially corrugated grooves at a fixed distance from the center of the springs. Both springs 60 and 61 are automatically centered with the shaft 13 upon assembly, because the lugs such as 62 and 63 will only fit the corrugations in the springs at a fixed radial distance from the center thereof.

It will be seen that the spring means 60, 61 yieldingly urges the sides 45 and 47 of the pulleys 11 and 12 towards the sides 44 and 46 thereof, (i. e. towards a condition in which the pulleys have their maximum effective diameter) and at the same time is the sole means of connecting the axially adjustable pulley sides 45 and 47 to the shaft 13, for rotation therewith.

As shown in Fig. 2, weights such as 70 and 71 are attached to the disc springs 60 and 61 respectively in such a manner that a component of the centrifugal force of the weights tends to deflect the springs. The weights are hooked around the inner periphery of the springs and lie within the corrugations of the springs.

The relative speed ratio of the shafts 13 and 3 will change with the speed of the governed pulleys 11 and 12. It will be appreciated that the ratio change characteristics can be varied by changing the relationship of the springs in the driving and driven pulleys, or by changing the number and size of the weights, or the location of their center of gravity, in relation to the point of attachment of the weights to the springs.

Referring now to Fig. 3, which shows a single V belt pulley suitable for a fan drive for instance, the pulley has two coned sides 80 and 81, of which the side 80 along with the fan 83 is secured to a hub 84 by bolts 85, the hub 84 being keyed to the shaft 86 by a key 87, and locked thereon by the nut 88 on the shaft 86.

The side 81 of the pulley, which is the adjustable half of the pulley, is radially spaced away from sliding contact on the shaft 86, and is resiliently supported concentrically of the shaft, on two radially corrugated disc springs 90 and 91.

The inner edges of the springs 90 and 91 engage lugs or teeth such as 92 and 93, arranged in axially spaced circles on a hub 94, which is secured to the shaft 86 against a shoulder 95. The outer edges of the springs 90 and 91 engage lugs or teeth 96 and 97, arranged in axially spaced circles on the pulley side 81. The lugs such as 92, 93 and 96, 97 are shaped to fit in the radially corrugated grooves of the springs 90 and 91, the lugs such as 92 and 93 fitting the outwardly divergent grooves towards the apices of the springs, urging both springs in one direction, and the lugs such as 96, 97 fitting the outwardly divergent grooves towards their outer peripheries, urging both springs in an opposite direction.

The two springs 90 and 91 yieldingly urge the side 81 of the pulley towards the side 80 thereof, (i. e. towards a condition in which the pulley has the maximum effective diameter for the V belt 98) and at the same time are the only means of supporting the axially movable side 81 of the pulley in axial alignment with the fixed side 80, as well as being the sole means of connecting it to the shaft 86 for rotation therewith. It will be seen that all sliding bearings are dispensed with.

A spring of the type shown in Fig. 4 has the advantage of compactness and a rate which is controllable within wide limits without changing its overall dimensions. It may have not only a positive rate, but a zero rate, or a negative rate, (i. e. it may be a spring of which the deflecting force increases with deflection, of which no change of force is required for an increased deflection, or of which a lesser force is required for an increased deflection).

If both the driving and the driven pulleys of a variable ratio V belt drive such as that shown in Figs. 1 and 2, are each provided with zero rate spring means of equal force, there would be a constant belt tension and very little resistance to a change of ratio. If the pulley, or pulleys, on one shaft are provided with positive rate spring means, and those on the other shaft with negative rate spring means, the spring pressure of the positive rate spring means will be increased as the effective diameter of its pulleys is reduced, while the spring pressure of the negative rate spring means will be increased as the effective diameter of its pulleys is increased. The spring pressures in the pulleys on both shafts will be increased or decreased together, upon any change in ratio. It will be appreciated that as the spring pressure in the pulleys on both of the shafts is increased the belt tension will be increased, and vice versa. When the V belt pulleys provide a drive between a constant torque shaft to a variable torque shaft, the belt tension should be high when the effective pulley diameter on the constant torque shaft is small, and vice versa; the use of a positive rate spring on the pulley of the constant torque shaft in conjunction with a negative rate spring on the pulley of the variable torque shaft will automatically give this change in belt tension.

The force necessary to change the pulley diameters, is the difference between the spring pressures in the driving and driven pulleys, and for this reason the springs should be matched so that the difference in spring pressure between them is small.

Actually, with positive and negative rate springs, there need be no difference between the two spring pressures at any drive ratio, and only small forces will be required to change the effective diameters of the pulleys and the drive ratio.

I claim:

1. A shaft, an expanding and contracting V belt pulley thereon having one coned side movable relatively to another axially of the shaft, to vary the effective diameter of the pulley, and radially corrugated disc spring means resiliently urging said movable side towards the other and tending to increase the effective diameter of the pulley; said radially corrugated disc spring means being the sole means of connecting the movable pulley side to the shaft for rotation therewith.

2. The combination according to claim 1, in which that pulley side which is connected to the shaft for rotation therewith, by radially corrugated disc spring means, is slidable axially on the shaft, and the other of said sides is secured to the shaft.

3. The combination according to claim 1, in which the disc spring means is provided with weights having a centrifugal force component tending to deflect the spring means, to vary the effective diameter of the pulley in accordance with the speed at which it is driven.

4. The combination according to claim 1, in which the movable side of the pulley is radially spaced away from sliding contact on the shaft and is resiliently supported concentrically of the shaft, on two radially corrugated axially spaced disc springs, of which the inner edges engage lugs on the shaft and the outer edges engage lugs on the said movable side of the pulley.

5. The combination according to claim 1, in which the radially corrugated disc spring means is a pair of conical radially corrugated disc springs with their bases interlocked and their apices spaced apart, the said apices respectively engaging, lugs on a hub secured to the shaft, and lugs on the movable pulley side.

6. A variable ratio V belt pulley drive between two shafts, each of said shafts having an expanding and contracting V belt pulley thereon, having one coned side movable relatively to another axially of the shaft, to vary the effective diameter of the pulley, and disc spring means resiliently urging said movable side towards the other and tending to increase the effective diameter of the pulley; the disc spring means of one pulley having a positive rate, and the disc spring means of the other pulley having a negative rate.

7. A variable ratio V belt pulley drive between a constant torque shaft and a variable torque shaft, each of said shafts having an expanding and contracting V belt pulley thereon, having one coned side movable relatively to another axially of the shaft, to vary the effective diameter of the pulley, and disc spring means resiliently urging said movable side towards the other and tending to increase the effective diameter of the pulley; the disc spring means of the pulley on the constant torque shaft having a positive rate, and the disc spring means of the pulley on the variable torque shaft having a negative rate.

8. The combination according to claim 1, in which, the radially corrugated disc spring means is the sole means of supporting the movable pulley side concentric with the shaft and in axial alignment with the other pulley side.

JOHN O. ALMEN.